(12) United States Patent
Markus

(10) Patent No.: US 6,499,042 B1
(45) Date of Patent: Dec. 24, 2002

(54) SELECTIVE PROXY APPROACH TO FILLING-IN FORMS EMBEDDED IN DISTRIBUTED ELECTRONIC DOCUMENTS

(75) Inventor: Matthew A. Markus, San Francisco, CA (US)

(73) Assignee: Infospace, Inc., Bellevue, WA (US)

( * ) Notice: Subject to any disclaimer, the term of this patent is extended or adjusted under 35 U.S.C. 154(b) by 0 days.

(21) Appl. No.: 09/411,478

(22) Filed: Oct. 1, 1999

Related U.S. Application Data

(60) Provisional application No. 60/103,379, filed on Oct. 7, 1998.

(51) Int. Cl.[7] .............................................. G06F 17/21
(52) U.S. Cl. ...................................... 707/507; 709/219
(58) Field of Search ................................ 707/505–507, 707/513; 709/217–219, 202–203; 705/14

(56) References Cited

U.S. PATENT DOCUMENTS

| | | | |
|---|---|---|---|
| 5,640,577 A | | 6/1997 | Scharmer |
| 5,794,259 A | * | 8/1998 | Kikinis ........................ 707/507 |
| 6,085,242 A | * | 7/2000 | Chandra ...................... 709/223 |
| 6,192,380 B1 | * | 2/2001 | Light et al. .................. 707/505 |
| 6,199,079 B1 | * | 3/2001 | Gupta et al. ................. 707/507 |
| 6,237,022 B1 | * | 5/2001 | Bruck et al. ................. 709/200 |
| 6,237,031 B1 | * | 5/2001 | Knauerhase et al. ........ 709/203 |
| 6,247,029 B1 | * | 6/2001 | Kelley et al. ................ 707/507 |
| 6,253,228 B1 | * | 6/2001 | Ferris et al. ................. 707/202 |
| 6,321,256 B1 | * | 11/2001 | Himmel et al. ............... 705/14 |

FOREIGN PATENT DOCUMENTS

| | | |
|---|---|---|
| EP | 0 811 939 A2 | 12/1997 |
| WO | WO 99/46701 | 9/1999 |

OTHER PUBLICATIONS

Maret, P., et al., "Multimedia Information Interchange: Web Forms Meet Data Servers," in *Proceedings of the IEEE International Conference on Multimedia Computing and Systems*, vol. 2, Florence, Italy, Jun. 7–11, 1999, pp. 499–505.

* cited by examiner

*Primary Examiner*—Joseph H. Feild

(57) ABSTRACT

A method and apparatus for automatically filling in electronic forms online with a user's personal data. A location identifier, such as a URL, of a form originating server and a form location on the server that corresponds to an online form is transmitted to a form filling server. A user identifier, such as one contained in a cookie, is also transmitted to the form filling server. The location identifier of the form originating server and the location of the form on the form filling server is decoded or parsed on the form filling server. This allows the form filling server to open a connection between the form filling server and the form originating server. The form originating server is then requested to provide the form filling server with the online form so that the form filling server has a similar view of the online form as the user does. The online form is then parsed on the form filling server to identify the fields in the form that can potentially be filled in with personal data associated with the user. The personal data associated with the user is then inserted into the fields of the online form on the form filling server. The personal data of the user is identified using the user identifier.

15 Claims, 2 Drawing Sheets

SELECTIVE PROXY APPROACH TO FILLING-IN FORMS EMBEDDED IN DISTRIBUTED ELECTRONIC DOCUMENTS

This Application claims the benefit of Ser. No. 60/103,379, filed Oct. 7, 1998.

BACKGROUND

Field of Invention

This invention relates to computer information systems, specifically to an improved process that allows an entity to automatically release personal data to other entities connected via a computer network.

SUMMARY OF THE INVENTION

Methods and apparatus are disclosed for automatically filling in electronic forms online with a user's personal data. In one aspect of the present invention, a method of automatically filling in an online form with data associated with a user is described. A location identifier, such as a URL, of a form-originating server and a form location on the server that corresponds to an online form is transmitted to a form-filling server. A user identifier, such as one contained in a cookie, is also transmitted to the form-filling server. The location identifier of the form-originating server and the location of the form on the form-filling server is decoded or parsed on the form-filling server. This allows the form-filling server to open a connection between the form-filling server and the form-originating server. The form-originating server is then requested to provide the form-filling server with the online form so that the form-filling server has a similar view of the online form as the user does. The online form is then parsed on the form-filling server to identify the fields in the form that can potentially be filled in with personal data associated with the user. The personal data associated with the user is then inserted into the fields of the online form on the form-filling server. The personal data of the user is identified using the user identifier.

In another aspect of the present invention, a selective proxy server for automatically filling in an online form is described. The selective proxy includes a location-data receiving component which receives a location-identifier, such as a URL, of a form-originating server and a form location of the online form on the form-originating server. A location-data decoder or analyzer decodes the location-identifier. i.e., URL, and the form location on the server thereby allowing the selective proxy server to open a connection with form-originating server. A form-data receiving component is able to receive the online form at the form location on the form-originating server and a form parser then parses the online form thereby identifying the fields in the form to be filled in with personal data. A personal data storage component stores personal data of multiple users registered with a service managing the form-filling server. A data inserting module then inserts personal data of the user into the fields of the online form.

DRAWING FIGURES

The following drawings illustrate the static and dynamic elements of the novel selective proxy based approach to form filling.

Figure 1:
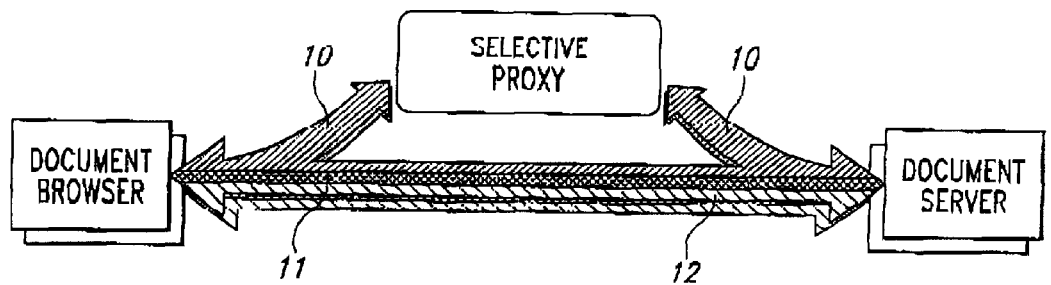

FIG. 1 shows the logical interconnections that are established during the selective proxy form-filling process.

Figure 2:
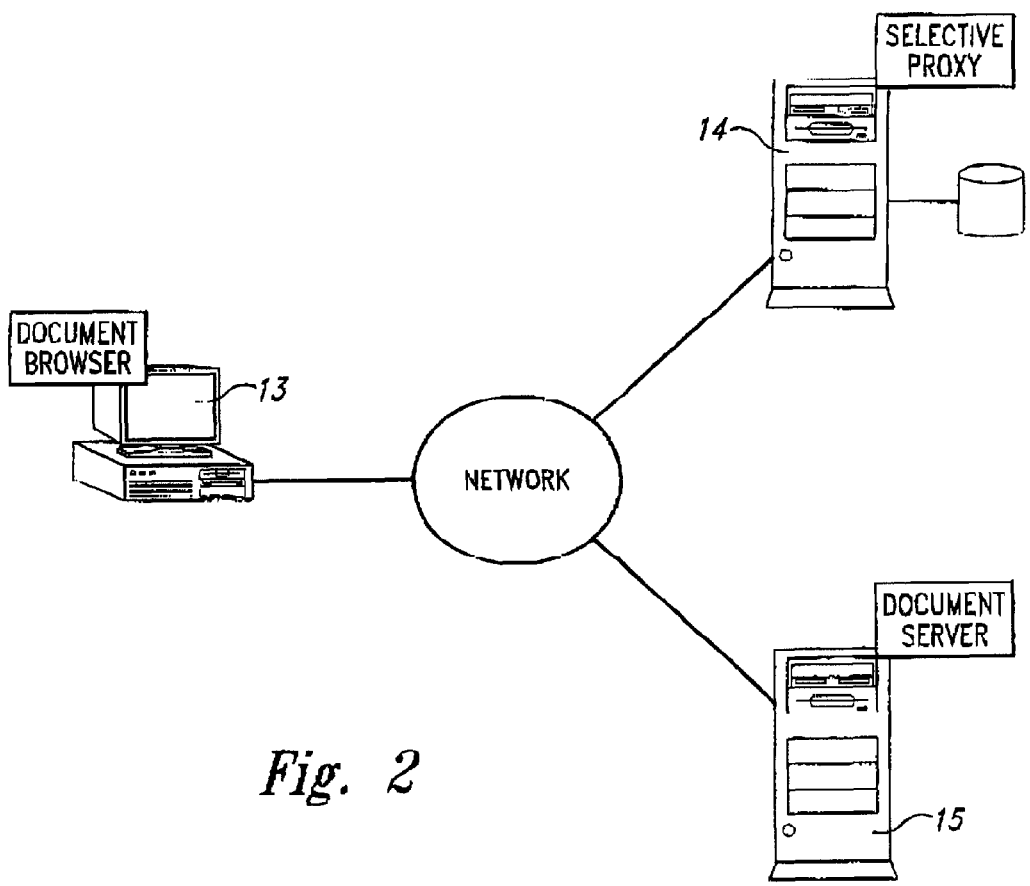

FIG. 2 provides a static view of how the software components that compose the environment in which the selective proxy form-filling process executes are typically distributed across computers.

Figure 3:
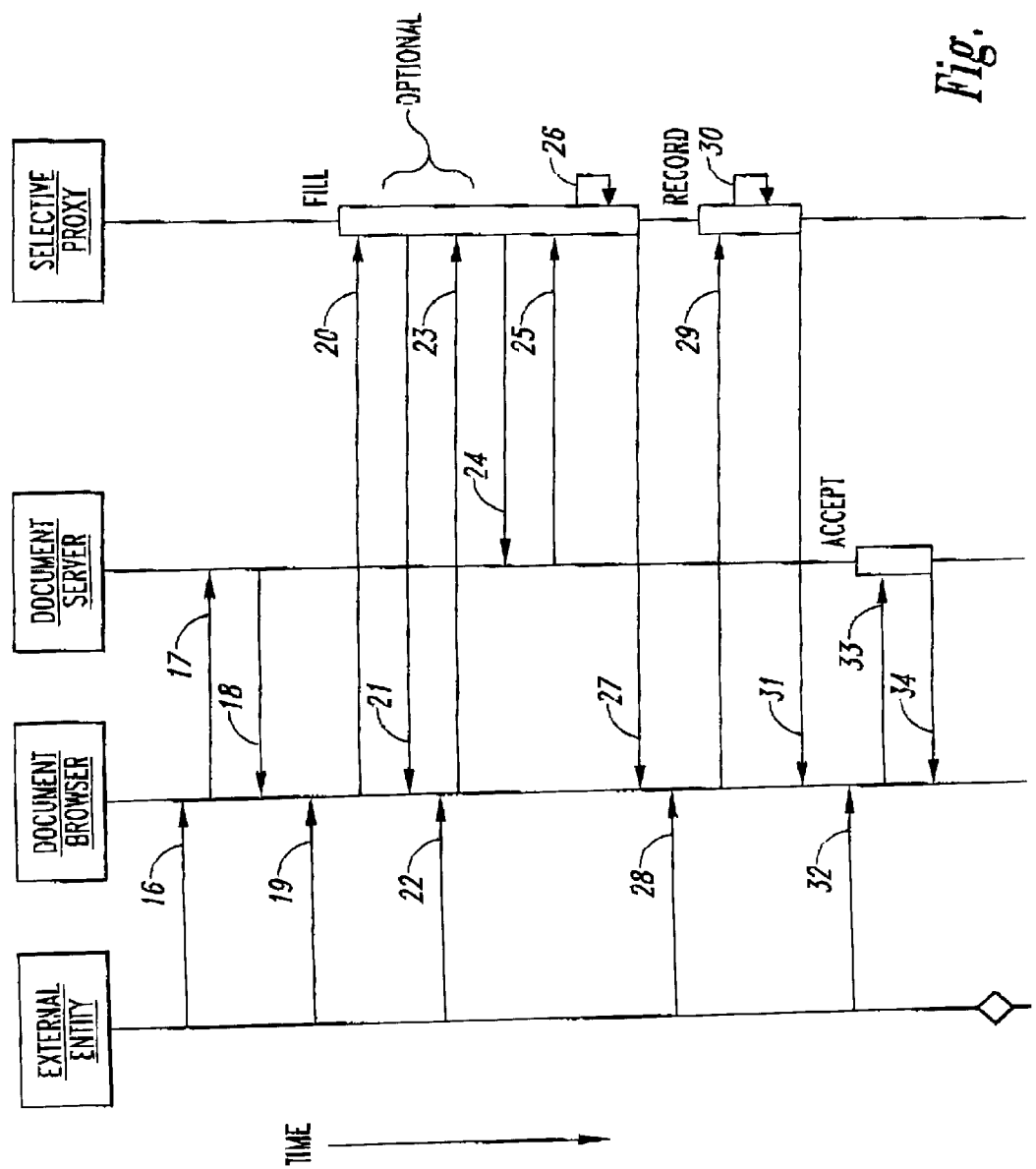

FIG. 3 a sequence diagram outlining how the software components that compose the environment in which the selective proxy form-filling process interacts in order to accomplish a form autofill.

DESCRIPTION

The selective proxy based approach to form autofilling requires an environment containing three types of software modules. The first kind of software module that must be present is a Document Browser. A Document Browser is a software program that requests documents from electronic resources on behalf of an external entity. It should be noted that a Document Browser may have the ability to display, archive, or analyze the documents it fetches. When a Document Browser makes a request for a document stored at an electronic resource, a Document Server handles it. Thus, a Document Server module is another crucial part of the environment in which the selective proxy approach to form autofilling takes place. A Document Server may be thought of as a manager or generator of active and static documents that contain content written, produced, or edited by one or more external entities. The last important module contained within the form autofilling system would be a Selective Proxy. A Selective Proxy is a piece of software that sits between a Document Browser and a Document Server in order to forward the requests and responses generated by these modules. In many ways a Selective Proxy is similar to a standard caching proxy that simply caches segments of opaque data that are sent through it. However, a Selective Proxy extends the simple caching proxy model by being dynamically built only when certain structural data elements are present. Additionally, a Selective Proxy usually performs some sort of modification to the structural elements it is interested in.

During the lifetime of a form autofill process, a series of logical connections are established among the active software modules mentioned in the preceding paragraph. These logical connections can be thought of as streams through which a document's structural elements flow. Often a given document consists of several different types of structural elements. An example of these streams is given in FIG. 1. Note that graphic advertisement banners 11 and active objects (applets) 12 are sent via logical streams connecting a Document Browser and a Document Server. In addition to these structural elements, forms 10 are also sent through the connection linking a Document Browser to a Document Server. Two more connections are also illustrated in FIG. 1. The first connection is between a Document Browser and a Selective Proxy while the second connection is between a Selective Proxy and a Document Server. These two connections have only forms 10 flowing through them since a Selective Proxy operating under our novel form autofilling process is only concerned with these element types. By utilizing a Selective Proxy in this manner, a larger volume of forms may be filled than could be provided by traditional architectures. Thus, the underlying configuration of the selective proxy based approach to form autofilling provides a novel, scalable solution without wasting network resources.

Naturally, the software modules involved in the selective proxy based approach to form autofilling control the behavior of underlying physical computer units. In FIG. 2, a typical example of how these modules may be distributed over a set of computers is presented. A client computer 13 usually contains an instance of a Document Browser software module since Document Browsers require less raw computing power than other software modules. A mid-range server machine 15 is used to house a Document Server module because one Document Server often services requests from several Document Browsers. Finally, a high-end server connected to a disk farm 14 runs a Selective Proxy module. It is expected such a powerful machine will be needed since it will potentially have to perform the autofill process hundreds of times a minute. All the computers in the diagram are connected to a network that may or may not wire the machines together via direct physical connections. It should be stressed that this example is not intended to limit a machine from containing more than one type of software module. One major benefit to relying on a server-side Selective Proxy architecture is that the need for introducing autofill technology directly into Document Servers and Document Browsers is eliminated.

Operation

The operation of the selective proxy based approach to from autofilling is revealed in FIG. 3. The first step, denoted as 16 in the diagram, occurs when an external entity instructs its Document Browser to fetch a document containing form elements. The Document Browser then contacts the Document Server module in 17 and formally requests the desired document. After the Document Server returns the requested document in 18, the external entity activates a form autofill trigger located in the recently loaded document as shown in 19. The autofill trigger causes the Document Browser to contact the Selective Proxy as depicted by the line marked 20. Now, if the Selective Proxy can not automatically identify the external entity requesting an autofill, a standard login mechanism must be presented to the entity as is done in 21. Once the entity enters its login information and has the Document Browser send it back to the Selective Proxy as indicated in 22 and 23 the normal autofilling process may continue. In 24, the Selective Proxy contacts the same Document Server the Document Browser connected in 17, and requests the exact same document. When the requested document arrives in 25, it is processed in the context of the current external entity and all the empty form fields in the document are filled in with relevant information as task 26 shows. The filled in document is then sent back to the Document Browser in 27 and displayed to the external entity. The external entity then manually verifies, corrects, and enters new data into the fields of the autofilled document. Once this is done, the entity uses its Document Browser, via tasks 28 and 29, to send the results to the Selective Proxy. The Selective Proxy records the transaction for future reference in 30. By recording the transaction, the Selective Proxy is able to learn about the external entity so that future autofills will be more complete and accurate. In addition the transaction may be referenced by the external entity for personal reasons. The last steps in the autofill process involve the sending of a document that aids the external entity in submitting. its data back to the Document Server, which is done in 31. Tasks 32 and 33 are then simply the normal procedures used to post form data to a Document Server. The process diagrammed in FIG. 3 only shows what is believed to be the most workable solution to autofill problem. Another option available to implementers is to have the Selective Proxy module actually forward the posted form data to the Document Server instead of having the Document Browser conduct this task.

Conclusion

Both the static description and dynamic behavior of a novel form autofilling process has been presented within this specification. The new process uses a Selective Proxy software module to fill in documents containing form elements. By taking a Selective Proxy approach a document's forms may now be filled without the need for upgrading Document Browser and Document Server software modules. The new process is also scalable and powerfully extends common document management infrastructures.

What is claimed is:

1. A method of electronically filling in an online form with data associated with a user, the method comprising:

transmitting from a client machine to a form-filling server a location identifier of a form-originating server and a form location corresponding to the online form on the form-originating server and a user identifier;

decoding at the form-filling server the location identifier and the form location thereby enabling the form-filling server to open a connection between the form-filling server and form-originating server;

requesting the form-originating server to provide the form-filling server with the online form so that the form-filling server has a similar view of the online form as the client machine does;

parsing the online form on the form-filling server thereby identifying fields in the online form to be filled in;

inserting data associated with the user into the fields in the online form on the form-filling server using the user identifier; and transmitting the online form with the inserted data associated with the user from the form-filling server to the client machine.

2. A selective proxy server for automatically filling in online forms comprising:

a request receiving component for receiving a request from a client computer to automatically fill in an online form;

a location-data receiving component for receiving a location-identifier of a form-originating server and a form location corresponding to the online form;

a location-data decoder for decoding the location-identifier and the form location;

a form-data receiving component for receiving a form indicated by the form location;

a personal data storage component for storing personal data corresponding to a plurality of users;

a form-data parser for parsing the online form thereby identifying fields to be filled in with personal data from the personal data storage component;

a data inserting component for inserting data into the fields in the online form; and a transmitting component for transmitting the filled in online form to the client computer in response to the request from the client computer.

3. A method for processing on a form-filling server an electronic form generated by a form-originating server, the method comprising:

receiving a request from a client computer;

obtaining an identification of the form-originating server;

obtaining the electronic form generated by the form-originating server;

identifying one or more fields to be completed on the electronic form;

obtaining user data associated with an identified user from a user database corresponding to a plurality of users;

inserting the user data into at least one field of the electronic form; and transmitting the electronic form with user data in at least one field to the client computer.

4. The method of claim 3, wherein obtaining the identification of the form-originating server includes obtaining a location of the form-originating server.

5. The method of claim 4, wherein the location is identified by a uniform resource locator identifier.

6. The method of claim 3, wherein identifying one or more fields to be completed on the electronic form includes parsing the electronic form to obtain the one or more fields to be completed.

7. The method of claim 3, wherein obtaining the electronic form includes requesting the electronic form from the form-generating server.

8. The method of claim 3, wherein obtaining user data associated with an identified user from a user database corresponding to a plurality of users includes:

obtaining a user identifier; and associating user data in the user database with the user identifier.

9. The method of claim 3, further comprising:

obtaining a completed electronic form from the identified user; and updating the user data associated with the identified user in the user database with data submitted in the completed electronic form.

10. A computer readable medium having computer executable instructions for performing the method recited in any one of claims 3–9.

11. A computer system having a processor, a memory and an operating environment, the computer system operable for performing the method recited in any one of claims 3–9.

12. A system for processing electronic forms, the system comprising:

a client computer with a document browser operable to request the automatic completion of at least one field of an electronic form;

a form-generating server operable to provide the electronic form; and a form-completion server operable to obtain the request for an automatic completion from the client computer with a document browser and to obtain at least a portion of the electronic form from the form-generating server;

wherein the client computer with a document browser is associated with an identified individual and wherein the form-completion server is further operable to insert user data associated with the identified individual into one or more fields of the electronic form.

13. The system of claim 12, wherein the client computer with a document browser is operable to obtain a partially completed form from the form-completion server and to submit a completed form, and wherein the form-completion server is further operable to obtain the submitted electronic form and to update the user data with data included in the submitted electronic form.

14. The system of claim 12, wherein the form-completion server is further operable to parse the electronic form to identify the one or more fields of the electronic form.

15. The system of claim 12, wherein the form-completion server is further operable to transmit to the client computer with a document browser a partially or fully completed electronic form.

* * * * *